US009990876B2

(12) United States Patent
Safavi et al.

(10) Patent No.: US 9,990,876 B2
(45) **Date of Patent: *Jun. 5, 2018**

(54) SYSTEM AND METHOD FOR MONITORING A SIGNAGE SYSTEM OF A TRANSIT VEHICLE

(71) Applicant: Luminator Holding LP, Plano, TX (US)

(72) Inventors: Ramin Safavi, Plano, TX (US); Zhicun Gao, Plano, TX (US); Xiaoping Zhou, Plano, TX (US); Larry T. Taylor, Blue Ridge, TX (US)

(73) Assignee: Luminator Holding LP, Plano, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/350,951

(22) Filed: Nov. 14, 2016

(65) Prior Publication Data

US 2017/0061841 A1 Mar. 2, 2017

Related U.S. Application Data

(63) Continuation of application No. 12/964,595, filed on Dec. 9, 2010, now Pat. No. 9,530,336.

(Continued)

(51) Int. Cl.

| | |
|---|---|
| ***G05B 23/02*** | (2006.01) |
| ***G09G 3/00*** | (2006.01) |
| ***G09F 21/04*** | (2006.01) |

(52) U.S. Cl.

CPC ........... *G09G 3/006* (2013.01); *G09F 21/048* (2013.01); *G09G 2320/0646* (2013.01);

(Continued)

(58) Field of Classification Search

None

See application file for complete search history.

(56) References Cited

U.S. PATENT DOCUMENTS 5,218,629 A 6/1993 Dumond, Jr. et al.
5,444,390 A 8/1995 Bartlett et al.

(Continued)

FOREIGN PATENT DOCUMENTS

CN 2168760 Y 6/1994
CN 2393752 Y 8/2000

(Continued)

OTHER PUBLICATIONS

U.S. Appl. No. 13/035,633, Swanson, Rick.

(Continued)

*Primary Examiner* — Brian Zimmerman
*Assistant Examiner* — Kevin Lau
(74) *Attorney, Agent, or Firm* — Winstead PC

(57) ABSTRACT

A sign-monitoring system includes at least one electronic sign and a controller comprising a processor and memory. The electronic sign includes a pixel array, the pixel array including a plurality of pixels. The electronic sign further includes an embedded controller coupled to the at least one electronic sign. The embedded controller develops diagnostic information for the at least one electronic sign, the diagnostic information including information related to a number of malfunctioning pixels in the plurality of pixels. The controller is communicably coupled to the embedded controller and receives at least a portion of the diagnostic information from the embedded controller. In addition, the controller assesses the at least a portion of the diagnostic information to develop health information. The assessment involves evaluating the information related to the number of malfunctioning pixels.

20 Claims, 5 Drawing Sheets

Related U.S. Application Data

(60) Provisional application No. 61/285,131, filed on Dec. 9, 2009.

(52) U.S. Cl.
CPC ... *G09G 2330/10* (2013.01); *G09G 2360/144* (2013.01); *G09G 2360/145* (2013.01)

(56) References Cited

U.S. PATENT DOCUMENTS

| | | | |
|---|---|---|---|
| 5,681,015 | A | 10/1997 | Kull |
| 5,905,434 | A | 5/1999 | Steffan et al. |
| 6,147,617 | A | 11/2000 | Kim |
| 6,414,650 | B1 | 7/2002 | Nicholson et al. |
| 6,437,692 | B1 | 8/2002 | Petite et al. |
| 6,473,677 | B1 | 10/2002 | Hershey et al. |
| 6,674,357 | B1 | 1/2004 | Bermel |
| 6,812,851 | B1 | 11/2004 | Dukach et al. |
| 6,888,454 | B2 | 5/2005 | Kurose |
| 6,915,209 | B1 | 7/2005 | Spann |
| 6,921,892 | B2 | 7/2005 | Colbeth et al. |
| 6,965,307 | B2 | 11/2005 | Pearson, Jr. et al. |
| 7,089,099 | B2 | 8/2006 | Shostak et al. |
| 7,129,856 | B2 | 10/2006 | Hering et al. |
| 7,142,104 | B1 | 11/2006 | Blueford |
| 7,478,492 | B2 | 1/2009 | Madonia |
| 2002/0009978 | A1 | 1/2002 | Dukach et al. |
| 2002/0037715 | A1 | 3/2002 | Mauney et al. |
| 2002/0159434 | A1 | 10/2002 | Gosior et al. |
| 2003/0113007 | A1 | 6/2003 | Iwasaki et al. |
| 2003/0188185 | A1 | 10/2003 | Banerjee et al. |
| 2004/0118991 | A1 | 6/2004 | Colbeth et al. |
| 2004/0263340 | A1 | 12/2004 | Pearson et al. |
| 2005/0020299 | A1 | 1/2005 | Malone et al. |
| 2005/0104747 | A1 | 5/2005 | Silic et al. |
| 2006/0089145 | A1 | 4/2006 | Chen et al. |
| 2006/0111793 | A1 | 5/2006 | Stokes et al. |
| 2006/0126857 | A1 | 6/2006 | Pavlov et al. |
| 2006/0213100 | A1 | 9/2006 | McCann |
| 2007/0015485 | A1 | 1/2007 | DeBiasio et al. |
| 2007/0139183 | A1 | 6/2007 | Kates |
| 2007/0159750 | A1 | 7/2007 | Peker et al. |
| 2007/0241988 | A1 | 10/2007 | Zerphy et al. |
| 2007/0272831 | A1 | 11/2007 | Dailey et al. |
| 2008/0055287 | A1 | 3/2008 | Ishikawa et al. |
| 2008/0100561 | A1 | 5/2008 | Price et al. |
| 2008/0117144 | A1 | 5/2008 | Nakano et al. |
| 2008/0198098 | A1 | 8/2008 | Gelbman et al. |
| 2009/0046033 | A1 | 2/2009 | Siegel |
| 2010/0042285 | A1 | 2/2010 | Abernethy, Jr. et al. |

FOREIGN PATENT DOCUMENTS

| | | | |
|---|---|---|---|
| CN | 1341321 | A | 3/2002 |
| CN | 2537090 | Y | 2/2003 |
| CN | 2631847 | Y | 8/2004 |
| CN | 1648643 | A | 8/2005 |
| CN | 201294071 | Y | 8/2009 |
| EP | 1416462 | A1 | 5/2004 |
| EP | 1538588 | A2 | 6/2005 |
| EP | 1801776 | A1 | 6/2007 |
| EP | 2048642 | A1 | 4/2009 |
| JP | H05324307 | A | 12/1993 |

OTHER PUBLICATIONS

U.S. Appl. No. 12/964,595, Safavi, Ramin.
Copenheaver, Blaine R., “International Search Report” for PCT/US2010/059749 dated Feb. 11, 2011, 3 pages.
Copenheaver, Blaine R.,“International Search Report” for PCT/US2011/026302 dated Apr. 19, 2011. (3 Pages).
Bluetooth, “Specification of the Bluetooth System”, Specification vol. 1, Version 1.1, Feb. 22, 2001, pp. 1-3, 19-23, 41-43, 47-54, 57, 92, 104, 109, 110, 120, 138, 143, and 921.
Bluetooth, “Specification of the Bluetooth System”, Specification vol. 1, Version 1.1, Feb. 22, 2001, additional pp. 45, 148, 149, 164, and 962-974.
Bluetooth, “Specification of the Bluetooth System”, Specification vol. 1, Version 1.1, Feb. 22, 2001; 1,084 pages.

SYSTEM AND METHOD FOR MONITORING A SIGNAGE SYSTEM OF A TRANSIT VEHICLE

CROSS-REFERENCE TO RELATED APPLICATIONS

This application is a continuation of U.S. patent application Ser. No. 12,964,595 filed on Dec. 9, 2010. U.S. patent application Ser. No. 12,964,595 claims priority from, and incorporates by reference the entire disclosure of, U.S. Provisional Application No. 61/285,131 filed on Dec. 9, 2009.

BACKGROUND

Technical Field

The present invention relates in general to electronic-sign systems, and more particularly, but not by way of limitation, to systems and methods for monitoring the operational health of such systems through diagnostic information.

History Of Related Art

The public-transit industry is well known for its signage. A plurality of signs may often be positioned in and/or around a bus, train, or other mode of transit to display information to passengers, potential passengers, and/or other observers. For example, busses often display route information on signs disposed on the outside of busses so the sign information can easily be observed. The information may include the name of the route that particular bus is servicing. In that way, potential passengers waiting at a bus stop will know which bus to board.

In early days of mass transportation, bus operators often used a placard displaying a route number which was placed in a window of the bus. Eventually, such placards were replaced by electronic signs capable of displaying a selected route number thereon. Electronic signs provide flexibility in the type of information that is displayed to passengers. In particular, light-emitting diodes (LEDs) have become commonplace in electronic signs due to various advantages that include, for example, efficient energy consumption, a long lifetime, improved robustness, small size, fast switching, and excellent durability. However, even electronic signs that utilize LEDs occasionally malfunction and therefore, for a variety of reasons, will fail to provide route information to passengers and potential passengers.

Currently, problems in the operational health of such systems such as, for example, failures in sign functionality, are generally only detected by a visual inspection by the bus operator. Oftentimes, however, the failures are only identified long after the failure begins and after many passengers and potential passengers are unable to obtain necessary transit information. Moreover, evaluation of a severity of any failures that are identified by the bus operator is subjective and often inaccurate. Therefore, failure-detection in current sign systems is ineffective and inefficient.

SUMMARY OF THE INVENTION

In one embodiment, the operational health of a sign is monitored by a sign-monitoring system which includes at least one electronic sign and a controller comprising a processor and memory. The electronic sign includes a pixel array, the pixel array including a plurality of pixels. The electronic sign further includes an embedded controller coupled to the at least one electronic sign. The embedded controller develops diagnostic information for the at least one electronic sign, the diagnostic information including information related to a number of malfunctioning pixels in the plurality of pixels. The controller is communicably coupled to the embedded controller and receives at least a portion of the diagnostic information from the embedded controller. In addition, the controller analyzes the at least a portion of the diagnostic information to develop health information. The analysis involves assessing a severity of the at least a portion of the diagnostic information, the assessment including evaluating the information related to the number of malfunctioning pixels.

In one embodiment, the operational health of a sign is monitored by a sign-monitoring method which includes providing a sign-monitoring system, the sign-monitoring system including at least one electronic sign and a controller comprising a processor and memory. Each electronic sign of the at least one electronic sign comprises a pixel array and an embedded controller, the pixel array comprising a plurality of pixels. The sign-monitoring method further includes, via the embedded controller, developing diagnostic information for the at least one electronic sign. The diagnostic information includes information related to a number of malfunctioning pixels in the plurality of pixels. In addition, the sign-monitoring method includes, via the controller, receiving at least a portion of the diagnostic information from the embedded controller. Furthermore, the sign-monitoring method includes, via the controller, analyzing at least a portion of the diagnostic information to develop health information. The analysis comprising assessing a severity of the at least a portion of the diagnostic information, the assessment comprising evaluating the information related to the number of malfunctioning pixels.

The above summary of the invention is not intended to represent each embodiment or every aspect of the present invention. It should be understood that the various embodiments disclosed herein can be combined or modified without changing the spirit and scope of the invention.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS

Figure 1:
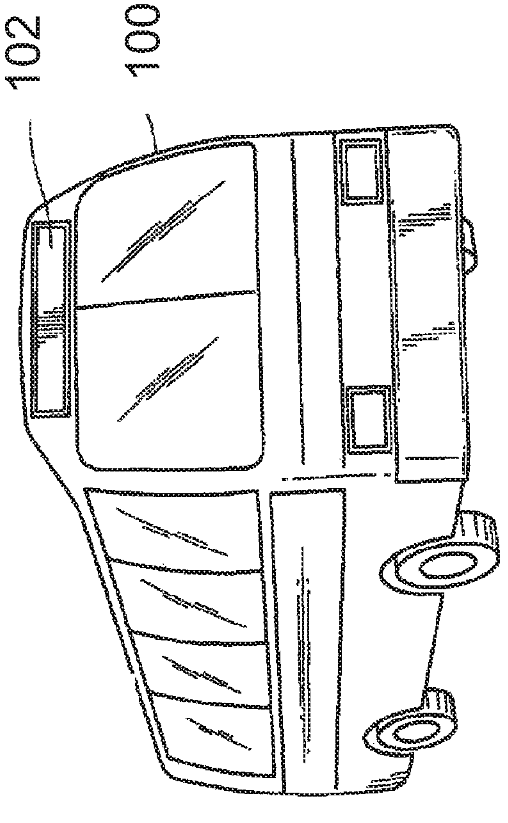
FIG. 1 is a perspective view of a bus utilizing an embodiment of a monitored sign system.

FIG. 1 illustrates a bus 100. Although the bus 100 is depicted in FIG. 1, it is contemplated that other types of transit vehicles may also be used such as, for example, a rail car. A sign 102 is shown on the bus 100. The sign 102 typically displays information pertaining to a route, such as, for example, a route number or route name. However, other information could be displayed by the sign 102. As one of ordinary skill in the art will appreciate, a transit vehicle such as, for example, the bus 100 may have a plurality of signs similar to the sign 102 thereon. For example, a transit vehicle may have a sign similar to the sign 102 on each of a front, middle, and left and right sides of the transit vehicle. By way of further example, the transit vehicle may have one or more signs similar to the sign 102 inside the transit vehicle.

Figure 2:
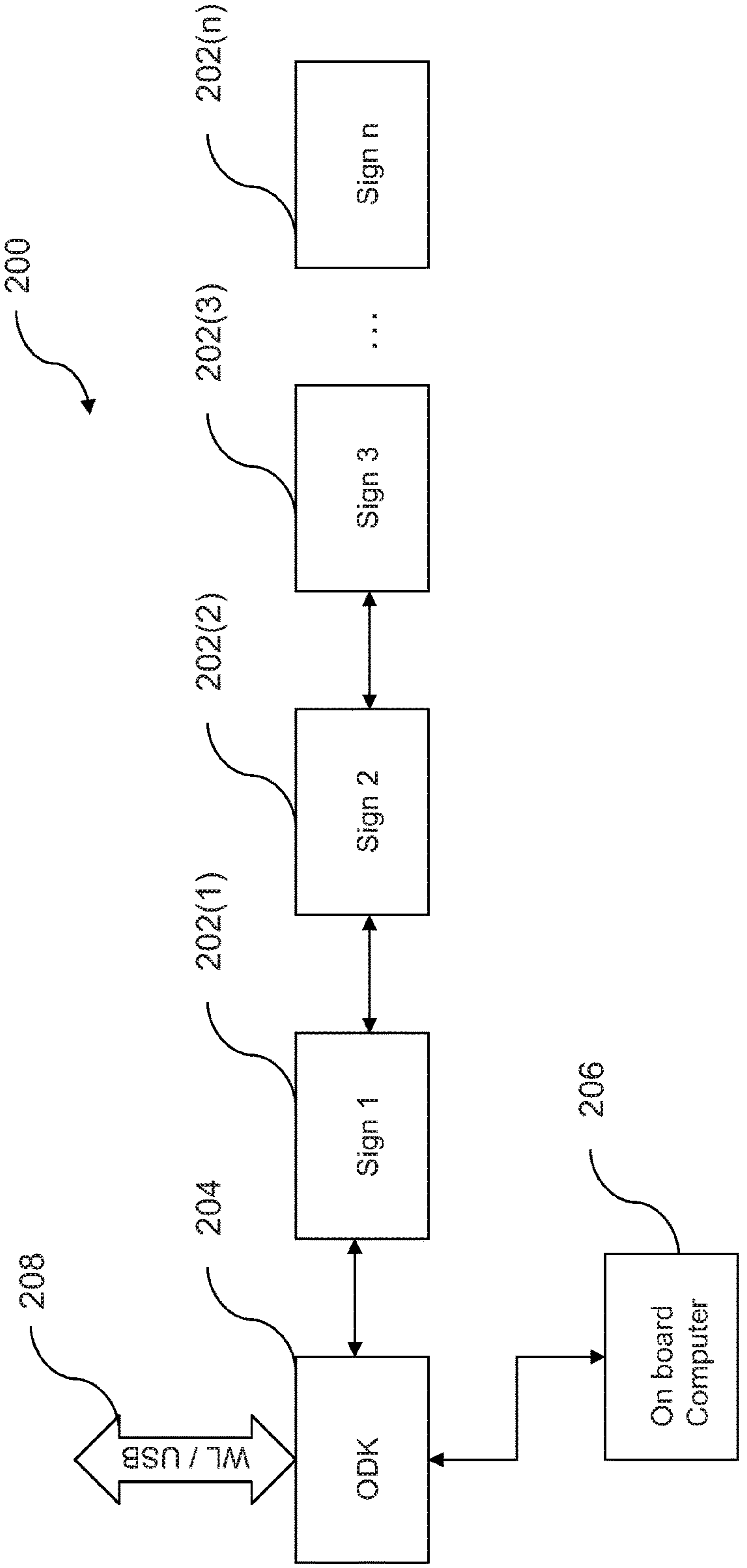
FIG. 2 illustrates a monitored sign system for a transit vehicle.

FIG. 2 illustrates a monitored sign system 200 for a transit vehicle such as, for example, the bus 100 of FIG. 1. The monitored sign system 200 may include a controller (ODK) 204, an on-board computer 206, and signs 202(1)-(*n*), which signs are referenced herein collectively as signs 202. While only the signs 202(1)-(*n*) are illustrated, in various embodiments, a monitored sign system such as, for example, the monitored sign system 200, may include any integral number of signs. In a typical embodiment, each of the signs 202 is operable to utilize light-emitting-diodes (LEDs) to provide display functionality similar to that described above with respect to the sign 102. In various embodiments, other types of displays may be utilized such as, for example, liquid crystal displays (LCDs) and the like.

In a typical embodiment, each sign of the signs 202 is additionally operable to collect and transmit diagnostic information for the sign to the ODK 204. The diagnostic information may be generally viewed as raw data that may be evaluated by the ODK 204 according to one or more preset standards to produce operational health information. The diagnostic information may include, for example, information regarding how each LED is operating (e.g., current draw and voltage drop).

As described in more detail below, in various embodiments, the operational health information, also referred to herein as simply "health," may be specifically for each sign or collectively for the monitored sign system 200 as a whole. As used herein, health information may be considered an assessment of specific diagnostic information such as, for example, for a sign or sign system. FIG. 2 depicts the signs 202 as connected in a linear, multi-drop configuration (e.g., RS-485). In a typical embodiment, the ODK 204 has direct communication with each of the signs 202. Various networking standards may be utilized to network the signs 202, the onboard computer 206, and the ODK 204 such as, for example, RS-232, RS-485, SAE J1708, SAE J1939, and IEEE 802.3 (i.e., Ethernet). However, one of ordinary skill in the art will appreciate that numerous other arrangements and standards are also contemplated within the scope of the invention.

In a typical embodiment, the ODK 204 is operable to monitor data exchanges between the ODK 204, the signs 202, and the on-board computer 206 and identify communication-link problems therebetween. For example, if one of the signs 202 or the on-board computer fails to respond to a request within a predetermined period of time, a communication-link problem may be determined to occur and the communication-link problem may be recorded as health information. By way of further example, if no communication is detected by the ODK 204 on a particular network for a predetermined period of time (e.g., five minutes), a communication-link problem may again be determined to exist. Communication-link problems may be reported as appropriate, for example, to an operator of a transit vehicle such as, for example, the bus 100, or to a remote server.

The ODK 204, optionally in conjunction with the on-board computer 206, typically monitors each sign of the signs 202 and maintains the diagnostic information transmitted by the signs 202. The diagnostic information may be used to generate health information for the monitored sign system 200 such as, for example, which ones of the signs 202, if any, are malfunctioning. In various embodiments, a sign from the signs 202 may be determined to be malfunctioning in any of a number of ways.

For example, in some embodiments, a sign from the signs 202 may be deemed malfunctioning if a sufficient number or percentage of LEDs in the sign are operating outside of predetermined specifications. By way of further example, a sign from the signs 202 may be deemed malfunctioning if all or a certain percentage of a specific set or combination of sets of LEDs in the sign are operating outside of predetermined specifications. In a typical embodiment, the ODK 204 is further operable to leverage the diagnostic information to generate health information for the monitored sign system 200. For example, the health information for the monitored sign system 200 may be generated based on any ones of the signs 202 that are deemed malfunctioning. In various embodiments, the health information may be displayed, for example, to an operator of a transit vehicle such as, for example, the bus 100.

In various embodiments, the ODK 204 is operable to transfer, via a communication interface 208, diagnostic information, log files and health information, for example, to a remote server or removable storage. In some embodiments, the communication interface 208 may be, for example, a wireless-networking interface or a universal serial bus (USB) interface. In a typical embodiment, the communication interface 208 is operable to be connected to, for example, an existing antenna or communication system of a transit vehicle such as, for example, the bus 100. For example, transit vehicles frequently are pre-equipped with communication systems in order to serve various other purposes such as, for example, automatic vehicle monitoring (AVM). In a typical embodiment, the communication interface 208 is operable to connect to such communication systems in order to transmit diagnostic information, log files, and health information to the remote server. The remote server, in various embodiments, may receive the diagnostic information, the log files, and the health information from a plurality of transit vehicles to, for example, monitor the health of electronic signage systems of an entire fleet of vehicles.

Figure 3:
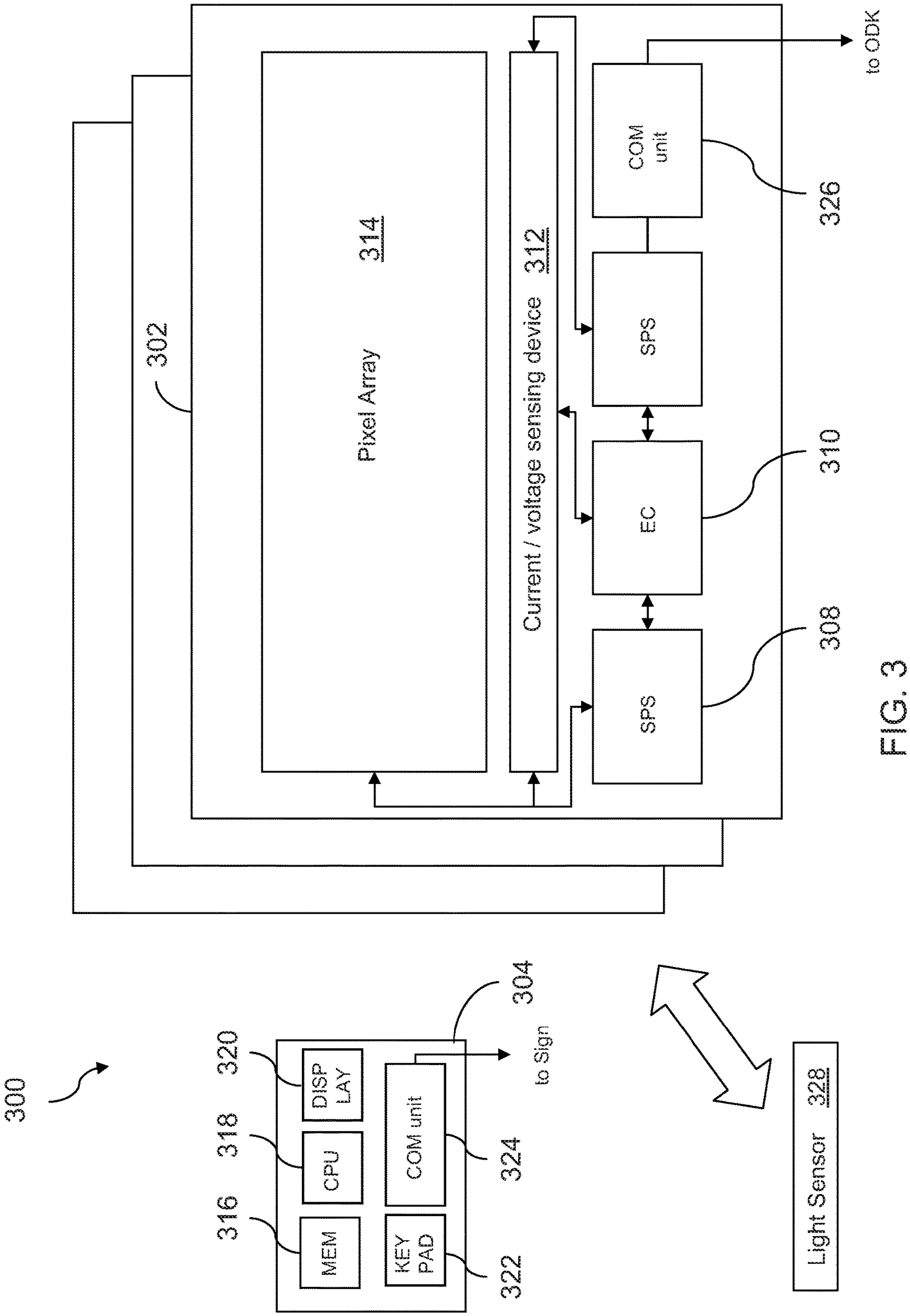
FIG. 3 illustrates a monitored sign system for a transit vehicle.

FIG. 3 illustrates a monitored sign system 300 for a transit vehicle. The monitored sign system 300 includes a sign 302, an ODK 304, and a light sensor 328. In various embodiments, the sign 302 is similar to the sign 102 and the signs 202 and includes a pixel array 314 utilizing LEDs, a current/voltage sensing device 312, one or more smart power supplies (SPS) 308, an embedded controller (EC) 310, and a communication unit 326. In various embodiments, the ODK 304 is similar to the ODK 204 of FIG. 2 and includes memory 316, a central processing unit (CPU) 318, a display 320, an input device 322 and a communication unit 324. In various embodiment, the light sensor 328 may be coupled, for example, to the sign 302 or the ODK 304. One of ordinary skill in the art will appreciate that the sign system 300 may include more, fewer, or different components from those shown in FIG. 3 without deviating from the principles of the invention.

Referring more specifically to the sign 302, the one or more SPS 308 and the EC 310 collaborate to provide an appropriate power feed to the pixel array 314. In a typical embodiment, the EC 310 controls a power value generated by the one or more SPS 308 and also operation of the one or more SPS 308 and the pixel array 314. In a typical embodiment, via the communication unit 326, the EC 310 communicates diagnostic information to the ODK 304 in a manner similar to that described with respect to the ODK 204 of FIG. 2.

Using the one or more SPS 308, the EC 310 is operable to drive each pixel of the pixel array 314. Via the current/voltage sensing device 312, the EC 310 is typically operable to measure a current draw and a voltage drop on each pixel of the pixel array 314 and compare the current draw and the voltage drop to preset thresholds for each. In a typical embodiment, the EC 310 can thereby identify proper operation of each LED utilized in the pixel array 314. The EC 310 can also identify a failure of the SPS 308, for example, using the current draw from the SPS 308 and a number of pixels in the pixel array 314 that are functioning properly.

More particularly, the current/voltage sensing device 312 may be operable, for example, to detect both an open circuit and a short circuit. In a typical embodiment, the EC 310 is operable to issue commands to the current/voltage sensing device 312 to determine, for each pixel in the pixel array 314, whether an open circuit or a short circuit exists. For example, the EC 310 may issue a command at predetermined intervals such as, for example, every two seconds, to determine, for each pixel in the pixel array 314, whether an open circuit exists. Similarly, the EC 310 may issue a command at predetermined intervals such as, for example, every two seconds, to determine, for each pixel in the pixel array 314, whether a short circuit exists. One of ordinary skill in the art will appreciate that other intervals are also possible. In some embodiments, open-circuit detection and short-circuit detection may occur simultaneously. In other embodiments, open-circuit detection and short-circuit detection may occur separately.

Responsive to a command to detect either an open circuit or a short circuit, the current/voltage sensing device 312 is typically operable to output a low-current pulse for each pixel in the pixel array 314. The low-current pulse is typically sufficiently low that no LED is lit. If the voltage from the low-current pulse exceeds a predetermined threshold for a given pixel, an open circuit may be determined. If the voltage from the low-current pulse is less than a predetermined threshold for a given pixel, a short circuit may be determined. In some embodiments, the EC 310 is operable to transmit diagnostic information resulting from each short-circuit or open-circuit detection performed to the ODK 304. In other embodiments, as described in more detail below, the sign 302 may internally process the diagnostic information and transmit the diagnostic information and transmit the diagnostic information to the ODK 304 upon request.

In a typical embodiment, the ODK 304 is communicably coupled to a plurality of signs in addition to the sign 302. Therefore, in a typical embodiment, the ODK 304 is operable to receive diagnostic information relating to any integral number of signs that may, for example, be similar to the sign 302. In a typical embodiment, the ODK 304 is operable to develop health information for each sign such as, for example, the sign 302, and develop overall health information for a sign system such as, for example, the sign system 300.

For example, in a typical embodiment, the ODK 304 is operable to verify proper operation of the light sensor 328. As one of ordinary skill in the art will appreciate, the light sensor 328 is operable to sense light and facilitate adjustment of a brightness, for example, of the pixel array 314, responsive thereto. In a typical embodiment, the EC 310 may issue a command that adjusts the brightness responsive to information from the light sensor 328. For example, in various embodiments in which the pixel array 314 utilizes LEDs, the pixel array 314 may be made brighter in bright lighting conditions (e.g., outdoors in daylight) and may be made dimmer in dark lighting conditions (e.g., outdoors at night). In a typical embodiment, the light sensor 328 incrementally brightens or dims the pixel array 314 responsive to lighting conditions and typically reports metrics regarding the lighting conditions, for example, to the ODK 304.

In a typical embodiment, the ODK 304 monitors the lighting conditions and/or periods of time during which the lighting conditions reported by the light sensor 328 either do not change or do not vary outside of a predetermined range. For example, if the lighting conditions reported by the light sensor 328 do not change or do not vary outside of the predetermined range for a certain length of time (e.g., six hours), the ODK 304 may deem a malfunction of the light sensor 328 to have occurred. In other embodiments, the ODK 304 may monitor a brightness of the pixel array 314 rather than the light sensor 328. In a typical embodiment, the malfunction of the light sensor 328 may be recorded as health information and reported, for example, to an operator of a transit vehicle such as, for example, the bus 100, or to a remote server.

In various embodiments, the ODK 304 is operable to develop health information based on self-diagnostic information. In various embodiments, the ODK 304 is operable to verify proper operation of various features of the ODK 304. For example, in various embodiments, the ODK 304 may utilize, for example, backlighting, sound-making devices (e.g., buzzers), and the like in order to deliver, among other things, alerts and health information, for example, to an operator of a transit vehicle such as, for example, the bus 100 of FIG. 1. Additionally, the ODK 304 may periodically encounter errors, for example, logging health information or reading logged health information. In various embodiments, the ODK 304 is operable to detect whether, for example, the backlighting, the sound-making devices, and/or other features and functions of the ODK 304 are operational. In various embodiments, the ODK 304 is operable to record this information as health information that may be, for example, presented to an operator of a transit vehicle such as, for example, the bus 100, or to a remote server.

In a typical embodiment, the ODK 304 accumulates diagnostic information for each of the plurality of signs such as, for example, the sign 302, and performs various analyses on the diagnostic information. For example, the diagnostic information received by the ODK 304 relative to the sign 302 includes information regarding pixels at which a malfunction has occurred (i.e., malfunctioning pixels). As described above, a malfunctioning pixel may be determined, for example, via an identified open circuit or short circuit. In a typical embodiment, the ODK 304 is operable to receive diagnostic information related to the pixel array 314 and determine a health of a sign such as, for example, the sign 302.

As will be described in more detail below with respect to FIG. 4, various algorithms may be utilized to develop diagnostic information and health information for a sign such as, for example, the sign 302. For example, the pixel array 314 may be analyzed as a matrix. In various embodiments, an algorithm may be implemented by the EC 310 that determines how many malfunctioning pixels have occurred within one column or one row of the matrix. If more than a predetermined number or percentage of malfunctioning LEDs occur within one row or one column of the matrix, the ODK 304 may determine the sign 302 to have a failure that requires immediate service.

In various embodiments, for example, another algorithm may be implemented by the EC 310 that identifies a total number of malfunctioning LEDs that have occurred on a sign such as, for example, the sign 302. If the total number of malfunctioning LEDs is greater than a predetermined threshold, the ODK 304 may determine the sign 302 to have a severe failure that requires immediate service. One of ordinary skill in the art will appreciate that other algorithms may also be utilized and should be considered to be within the scope of the invention. In various embodiments, thresholds for determining severity of malfunctioning LEDs may be user-programmable and/or may vary depending on a message being displayed on the sign 302. In a typical embodiment, the ODK 304 can be configured to report or log failures based upon a severity of the results as determined by the various algorithms quantifying the severity. For example, the sign 302 might not require service if a few sparsely-located LEDs fail because this failure would not have any impact upon the functionality of displaying, for example, route information to passengers on a transit vehicle such as, for example, the bus 100 of FIG. 1. Conversely, if a sign such as, for example, the sign 302 is determined to have a severe failure, in a typical embodiment more immediate service may be warranted.

One of ordinary skill in the art will recognize that if a sign such as the sign 302 is malfunctioning, it may be difficult or impossible for a potential passenger to determine, for example, a destination or route of the transit vehicle. Thus, in various embodiments, it is advantageous to make health information for a monitored sign system such as, for example, the monitored sign system 300, available through a variety of interfaces. In that way, a decision can more easily be made, for example, whether to take the transit vehicle out of service for repairs. In a typical embodiment, the ODK 304 provides data storage for the diagnostic information for the sign 302 and is operable to provide real-time information regarding any malfunctions in the sign 302 and any other connected signs and the health information for the monitored sign system 300 to an operator. Thus, in a typical embodiment, the ODK 304 is operable to aggregate health information for each monitored sign such as, for example, the sign 302, to develop overall health information for the sign-monitoring system 300.

In various embodiments, the health information may also be made available on the transit vehicle. For example, the display 320 of the ODK 304 may, in some embodiments, indicate a malfunction in the monitored sign system 300 and a severity of the malfunction. In various embodiments, using pass-code-protected menus, a location and details concerning, for example, failures may be identified by the operator. For example, the health information may be classified into a plurality categories such that each category is assigned a color. For example, a red indicator on the display 320 may be defined so as to suggest a high degree of severity for the malfunction. As discussed above, in a typical embodiment, the ODK 304 is operable to monitor diagnostic information from signs such as, for example, the signs 202 or the sign 302. In various embodiments, the ODK 304 is additionally operable to provide on the display 320 a real-time status of each sign such as, for example, the signs 202 or the sign 302.

Figure 4:
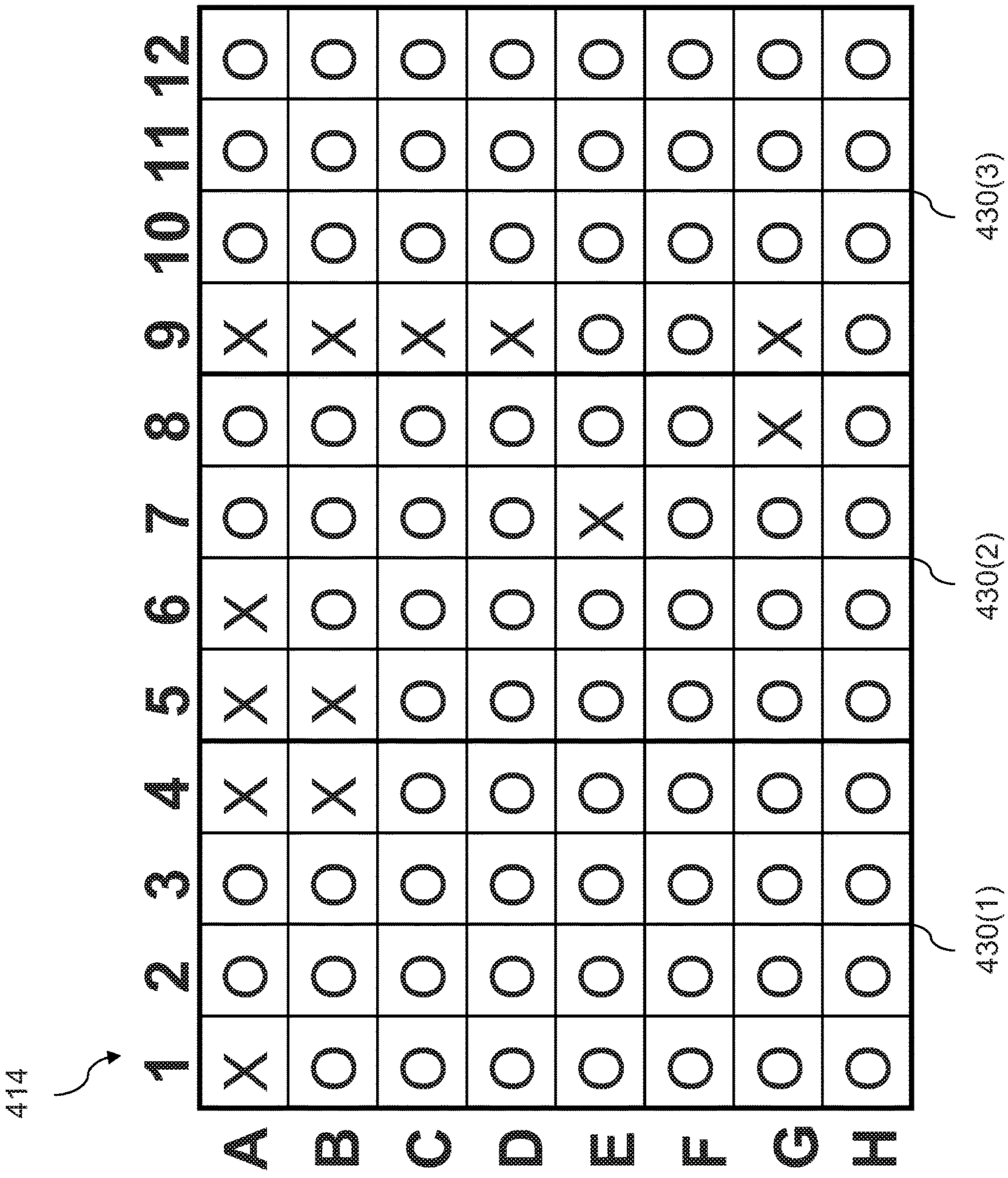
FIG. 4 shows diagnostic information that may be derived for an illustrative pixel array.

FIG. 4 shows diagnostic information that may be derived for an illustrative pixel array 414. In various embodiments, the pixel array 414 may be similar to the pixel array 314 described with respect to FIG. 3 and may correspond to a sign such as, for example, the sign 302. The pixel array 414 is illustrated as being formed from three sub-arrays. For example, each sub-array may correspond to a printed circuit board (PCB), namely, PCBs 430(1), 430(2), and 430(3). The PCBs 430(1), 430(2), and 430(3) may be referenced collectively herein as PCBs 430. Each of the PCBs 430 provides, for example, LEDs necessary for providing a portion of the pixel array 414. For simplicity of illustration, the pixel array 414 is 8 pixels (rows A-H) by 12 pixels (columns 1-12) and is illustrated as including three PCBs 430. However, in various embodiments, numerous other pixel-array sizes and types and numbers of PCBs such as, for example, the PCBs 430, may be utilized.

In FIG. 4, an 'X' indicates a pixel (e.g., LED) at which a malfunction has been detected, for example, by the EC 310 in conjunction with the voltage-sensing device 312 as described with respect to FIG. 3. The malfunction may be based on, for example, a short circuit or an open circuit. In FIG. 4, an 'O' indicates a pixel at which no malfunction has been detected and is thus assumed to be functioning properly. Referring to FIGS. 3 and 4 together, in a typical embodiment, the EC 310 is operable to combine information obtained from a most-recent open-circuit detection and a most-recent short-circuit detection to derive diagnostic information similar to that shown in FIG. 4 by way of an 'X' or an 'O'. As one of ordinary skill in the art will appreciate, in order to compile, for example, the diagnostic information illustrated in FIG. 4 for the pixel array 414, the EC 310 is operable to compile results from the short-circuit and open-circuit detections across the PCBs 430.

Referring to FIGS. 3 and 4 collectively, in a typical embodiment, the EC 310 is operable to create a reduced set of diagnostic information from, for example, the diagnostic information illustrated in FIG. 4 for the pixel array 414. For example, the EC 310 is typically operable to determine, for example, how many malfunctioning pixels occur consecutively in each column or row, a total number of short circuits that were detected in each of the PCBs 430, and a total number of open circuits that were detected in each of the PCBs 430. The reduced set of diagnostic information may include, for example, a maximum number of consecutive malfunctions for any row across the pixel array 414, a maximum number of consecutive malfunctions for any column across the pixel array 414, a total number of short circuits for each of the PCBs 430, and a total number of open circuits for each of the PCBs 430, and/or other desired sets of information. For example, with reference to the pixel array 414, a maximum number of consecutive malfunctions for any column is four (i.e., column 9) and a maximum number of consecutive malfunctions for any row is three (i.e., row A).

In various embodiments, reducing the diagnostic information to the reduced set of diagnostic information as described above minimizes an impact on network bandwidth in communications with the ODK 304. Sending a location of each malfunctioning pixel in a pixel array to the ODK 304 would effectively be transmitting an image of the pixel array. Rather than transmitting an image of, for example, the pixel array 414, the EC 310 may transmit a much smaller data stream that includes, for example, only diagnostic information that the ODK 304 requires to develop health information. In various embodiments, the reduced set of diagnostic information may be user-configurable and thus be adjusted to include additional necessary diagnostic information or exclude superfluous diagnostic information, as may be appropriate for a particular application. Additionally, reducing the diagnostic information to the reduced set of diagnostic information as described above typically minimizes a processing burden, for example, on the ODK 304. In a typical embodiment, the ODK 304 receives diagnostic information for a plurality of signs such as, for example, the sign 302 of FIG. 3. Therefore, in various embodiments, receiving the reduced set of diagnostic information may decrease bandwidth used, processing loads, and hardware requirements for the ODK 304.

Still referring to FIGS. 3 and 4 together, in various embodiments, the reduced set of diagnostic information may further include information related to internal communication and processing integrity on a sign such as, for example, the sign 302. In a typical embodiment, the information related to internal communication and processing integrity may be developed from a loop-back test. The loop-back test may involve the EC 310 sending a test pattern through the PCBs 430 in a daisy-chain manner for performance of a shift on the test pattern. The test pattern is typically a predetermined series of bits. For example, the EC 310 may initially pass the test pattern to the PCB 430(1) for a shift, which passes an output following the shift to the PCB 430(2). The PCB 430(2) performs a shift on the output from the PCB 430(1) and passes an output to the PCB 430(3). The PCB 430(3) performs a shift on the output from the PCB 430(2) and passes a final output back to the EC 310. In a typical embodiment, if the final output received by the EC 310 matches an expected result, the EC 310 records that the sign 302 passes the loopback test and processing integrity is deemed to exist. Otherwise, the EC 310 records that the sign 302 fails the loopback test and processing integrity is deemed not to exist. In various embodiments, this information may be part of the reduced set of diagnostic information.

Still referring to FIGS. 3 and 4 together, in a typical embodiment, the ODK 304 is operable to receive the reduced set of diagnostic information upon a request, for example, to the EC 310. In a typical embodiment, the ODK 304 is operable to evaluate the reduced set of diagnostic information to develop health information using predetermined thresholds. For example, in various embodiments, the ODK 304 may store thresholds for a maximum number of consecutive malfunctions for a row and a maximum number of consecutive malfunctions for a column. In a typical embodiment, the thresholds are user-configurable and may vary depending on a size of a sign such as, for example, the sign 302.

For example, for the pixel array 414 illustrated in FIG. 4, the ODK 304 may use a threshold of three for a given column or row. In that way, more than three consecutive malfunctions in a given column or row constitutes a failure of a sign such as, for example the sign 302, and immediate service may be required. For example, for the pixel array 414 described above, the reduced set of diagnostic information indicates to the ODK 304 that a column exists with four consecutive malfunctions and that a row exists with three consecutive malfunctions. While the three consecutive malfunctions for a given row does not exceed the threshold, the four consecutive malfunctions for a given column is in excess of the threshold. Therefore, the ODK 304 may deem a sign failure to occur and perform appropriate reporting procedures as described above with respect to FIGS. 2 and 3.

Figure 5:
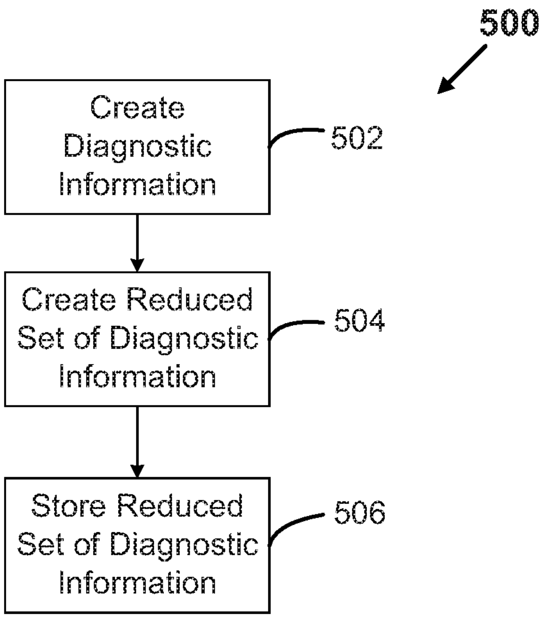
FIG. 5 describes a process for creating diagnostic information.

FIG. 5 describes a process 500 that may be performed, for example, by the EC 310 of FIG. 3. At step 502, diagnostic information is created. The diagnostic information may, for example, identify malfunctioning pixels in a pixel array for an electronic sign. From step 502, the process 500 proceeds to step 504. At step 504, a reduced set of diagnostic information is created from the diagnostic information. The reduced set of diagnostic information may include, for example, a maximum number of consecutive malfunctioning pixels for a given column or row of a pixel array. The reduced set of diagnostic information may, for example, be developed as described with respect to FIG. 4. From step 504, the process 500 proceeds to step 506. At step 506, the reduced set of diagnostic information is stored pending a request from a controller such as, for example, the ODK 204 of FIG. 2 or the ODK 304 of FIG. 3. In a typical embodiment, only a most recent version of the reduced set of diagnostic information is maintained. Following step 506, the process 500 ends.

Figure 6:
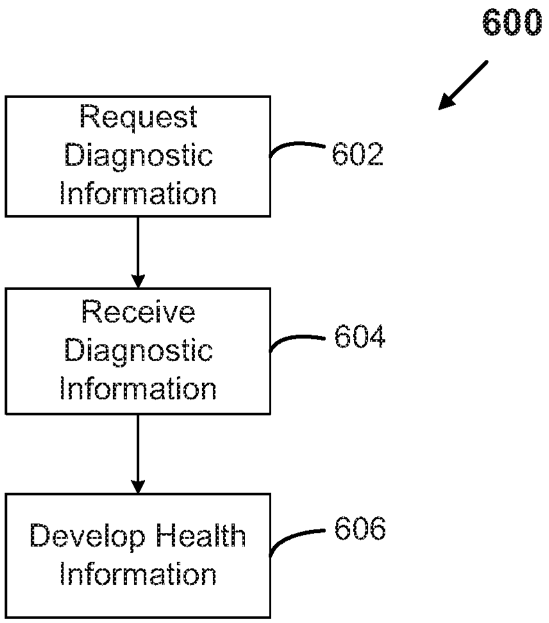
FIG. 6 describes a process for developing health information.

FIG. 6 describes a process 600 that may be performed, for example, by the ODK 204 of FIG. 2 or the ODK 304 of FIG. 3. At step 602, diagnostic information for an electronic sign system is requested. In a typical embodiment, the diagnostic information is requested for one or more electronic signs in the electronic sign system. For example, diagnostic information may be requested from the EC 310 of FIG. 3. From step 602, the process 600 proceeds to step 604. At step 604, the diagnostic information is received. The diagnostic information may, for example, be the reduced set of diagnostic information described with respect to FIG. 5. From step 604, the process 600 proceeds to step 606. At step 606, health information is developed for the electronic system. In a typical embodiment, the health information may be developed and reported as described with respect to FIGS. 2, 3, and 4. Following step 606, the process 600 ends.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A sign-monitoring system comprising:

at least one electronic sign, the at least one electronic sign comprising:

a pixel array, the pixel array comprising a plurality of pixels;

wherein the pixel array comprises a plurality of printed circuit boards (PCBs), each PCB providing a sub-array of the pixel array; and an embedded controller coupled to the at least one electronic sign operable to:

analyze the pixel array as a single matrix; and determine a number of malfunctioning pixels in at least one of:

a row of the single matrix, wherein the row spans more than one PCB of the plurality of PCBs; and a column of the single matrix, wherein the column spans more than one PCB of the plurality of PCBs; and transmit diagnostic information to a controller, the diagnostic information comprising information related to the determined number.

2. The sign-monitoring system of claim 1, comprising:

wherein each electronic sign of the at least one electronic sign comprises a voltage-sensing device, the voltage-sensing device measuring voltage across the plurality of pixels; and wherein the embedded controller:

issues at least one command to the voltage-sensing device selected from the group consisting of: a command to detect short circuits in the plurality of pixels and a command to detect open circuits in the plurality of pixels; and for each pixel in the plurality of pixels, determines the pixel to be a malfunctioning pixel responsive to a detected short circuit or a detected open circuit.

3. The sign-monitoring system of claim 1, wherein the embedded controller:

analyzes diagnostic information to create a reduced set of diagnostic information; and transmits the reduced set of diagnostic information to the controller.

4. The sign-monitoring system of claim 1, comprising a controller comprising a processor and memory communicably coupled to the embedded controller, wherein the controller:

receives at least a portion of the diagnostic information from the embedded controller; and assesses at least a portion of the diagnostic information to develop health information, the assessment comprising evaluating the information related to the number of malfunctioning pixels.

5. The sign-monitoring system of claim 4, wherein the number of malfunctioning pixels comprises a number of consecutive malfunctioning pixels; and wherein, responsive to the number of consecutive malfunctioning pixels exceeding a predetermined threshold, the controller determines that service of the pixel array is required, the determination of service being included as part of the health information.

6. The sign-monitoring system of claim 4, wherein, responsive to the number of malfunctioning pixels exceeding a predetermined threshold, the controller determines that service of the pixel array is required, the determination of service being included as part of the health information.

7. The sign-monitoring system of claim 4, comprising:

wherein the at least one electronic sign comprises a plurality of electronic signs and the health information comprises overall health information for the sign-monitoring system; and wherein the assessment comprises aggregating health information for each of the plurality of electronic signs.

8. The sign-monitoring system of claim 7, wherein the sign-monitoring system is implemented on a transit vehicle and the plurality of electronic signs are mounted for viewing on the transit vehicle.

9. The sign-monitoring system of claim 4, wherein the controller reports at least a portion of the health information, the report comprising at least one selected from the group consisting of:

display of at least a portion of the health information to an operator of a transit vehicle.

storage and logging of the at least a portion of the diagnostic information and the at least a portion of the health information in computer-readable storage;

transmission of the at least a portion of the health information to an external device; and transmission of the at least a portion of the health information to a remote server.

10. The sign-monitoring system of claim 4, wherein the controller generates self-diagnostic information related to features of the controller, the self-diagnostic information being selected from the group consisting of: information related to backlighting, information related to a sound-making device, and information related to data-access errors.

11. The sign-monitoring system of claim 4, comprising:

wherein the controller detects at least one communication-link problem over one or more networks in the sign-monitoring system; and wherein information related to the detection is included as part of the health information.

12. The sign-monitoring system of claim 4, comprising:

a light sensor coupled to at least one of the at least one electronic sign, wherein the light sensor senses light and, responsive thereto, facilitates adjustment of a brightness of the at least one of the at least one electronic sign; and wherein the controller receives information related to the brightness and verifies proper operation of the light sensor via the received information.

13. The sign-monitoring system of claim 1, wherein the plurality of pixels in the pixel array comprise a plurality of light-emitting diodes (LEDs).

14. The sign-monitoring system of claim 1, wherein the embedded controller performs a test for processing integrity between the plurality of PCBs, a result of the test being included as part of the diagnostic information.

15. A sign-monitoring method, the method comprising:

providing a sign-monitoring system, the sign-monitoring system comprising at least one electronic sign;

wherein each electronic sign of the at least one electronic sign comprises a pixel array and an embedded controller, the pixel array comprising a plurality of pixels;

wherein the pixel array comprises a plurality of printed circuit boards (PCBs), each PCB providing a sub-array of the pixel array;

the embedded controller analyzing the pixel array as a single matrix; and the embedded controller determining a number of malfunctioning pixels in at least one of:

a row of the single matrix, wherein the row spans more than one PCB of the plurality of PCBs; and a column of the single matrix, wherein the column spans more than one PCB of the plurality of PCBs; and the embedded controller transmitting diagnostic information to a controller, the diagnostic information comprising information related to the determined number.

16. The sign-monitoring method of claim 15, wherein a malfunctioning pixel comprises a pixel in the plurality of pixels at which at least one of a short circuit and an open circuit is determined to exist.

17. The sign-monitoring method of claim 15, comprising:

reducing an amount of network bandwidth necessary to transmit the diagnostic information, the reducing comprising creating a reduced set of diagnostic information relative to an overall set of diagnostic information; and transmitting the reduced set of diagnostic information to the controller.

18. The method of claim 15, comprising a controller comprising a processor and memory communicably coupled to the embedded controller, wherein the controller:

receives at least a portion of the diagnostic information from the embedded controller; and assesses at least a portion of the diagnostic information to develop health information, the assessment comprising evaluating the information related to the number of malfunctioning pixels.

19. The sign-monitoring method of claim 18, wherein the number of malfunctioning pixels comprises a number of consecutive malfunctioning pixels; and wherein, responsive to the number of consecutive malfunctioning pixels exceeding a predetermined threshold, determining, via the controller, that service of the pixel array is required, the determination of required service being included as part of the health information.

20. A sign-monitoring system comprising:

a plurality of electronic signs, each electronic sign in the plurality of electronic signs comprising:

a pixel array, the pixel array comprising a plurality of pixels;

wherein the pixel array comprises a plurality of printed circuit boards (PCBs), each PCB providing a subarray of the pixel array;

an embedded controller coupled to the electronic sign, the embedded controller creating diagnostic information for the electronic sign wherein the creating of the diagnostic information comprises:

an analysis of the pixel array as a single matrix; and a determination of a number of malfunctioning pixels in at least one of:

a row of the single matrix, wherein the row spans more than one PCB of the plurality of PCBs; and a column of the single matrix, wherein the column spans more than one PCB of the plurality of PCBs; and at least one controller comprising a processor and memory communicably coupled to the plurality of electronic signs, wherein the at least one controller requests and receives diagnostic information from the embedded controller for each of the plurality of electronic signs.

* * * * *